United States Patent
Defoy et al.

(10) Patent No.: US 11,001,038 B2
(45) Date of Patent: May 11, 2021

(54) LAMINATED ASSEMBLY

(71) Applicant: AGC GLASS EUROPE, Louvain-la-Neuve (BE)

(72) Inventors: Pierre Defoy, Louvain-la-Neuve (BE); Pierre Boulanger, Couthuin (BE); Samuel Martinquet, Moignelee (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 118 days.

(21) Appl. No.: 16/313,709

(22) PCT Filed: Jun. 21, 2017

(86) PCT No.: PCT/EP2017/065201
§ 371 (c)(1),
(2) Date: Dec. 27, 2018

(87) PCT Pub. No.: WO2018/001814
PCT Pub. Date: Jan. 4, 2018

(65) Prior Publication Data
US 2019/0322081 A1 Oct. 24, 2019

(30) Foreign Application Priority Data
Jun. 30, 2016 (BE) .................................. 16177227.2

(51) Int. Cl.
*B32B 17/10* (2006.01)
*H05B 3/84* (2006.01)

(52) U.S. Cl.
CPC .. *B32B 17/10385* (2013.01); *B32B 17/10036* (2013.01); *B32B 17/1055* (2013.01); *B32B 17/10302* (2013.01); *B32B 17/10807* (2013.01); *H05B 3/84* (2013.01); *B32B 2605/00* (2013.01)

(58) Field of Classification Search
CPC ........ B32B 17/10385; B32B 17/10036; B32B 17/10302; B32B 17/1055; B32B 17/10807; B32B 2605/00; H05B 3/84
USPC ....................................................... 296/84.1
See application file for complete search history.

(56) References Cited

U.S. PATENT DOCUMENTS

| 3,740,281 | A |   | 6/1973 | Fujiwara |
| 5,540,961 | A | * | 7/1996 | Reul ................. B32B 17/10376 428/34 |
| 6,396,026 | B2 | * | 5/2002 | Gillner .............. B32B 17/10385 219/203 |

(Continued)

FOREIGN PATENT DOCUMENTS

| WO | WO 2007122428 A1 | 11/2007 |
| WO | WO 2009/029897 A2 | 3/2009 |

OTHER PUBLICATIONS

International Search Report dated Sep. 20, 2017 in PCT/EP2017/065201 filed on Jun. 21, 2017.

*Primary Examiner* — D Glenn Dayoan
*Assistant Examiner* — E Turner Hicks
(74) *Attorney, Agent, or Firm* — Oblon, McClelland, Maier & Neustadt, L.L.P.

(57) ABSTRACT

An improved laminated assembly comprising functional elements with connections extending outside of the laminated assembly preventing air, moisture and water from entering the assembly as well as a method to prevent air, moisture and water from entering a laminated assembly.

21 Claims, 3 Drawing Sheets

(56) References Cited

U.S. PATENT DOCUMENTS

| | | | |
|---|---|---|---|
| 7,033,655 B2 * | 4/2006 | Beteille | B32B 17/10036 |
| | | | 428/1.5 |
| 7,132,625 B2 * | 11/2006 | Voeltzel | B32B 17/10036 |
| | | | 219/203 |
| 9,802,390 B2 * | 10/2017 | Ogawa | B32B 17/10385 |
| 2004/0067343 A1 | 4/2004 | Beteille et al. | |
| 2009/0176101 A1 | 7/2009 | Greenall et al. | |

* cited by examiner

LAMINATED ASSEMBLY

TECHNICAL DOMAIN OF THE INVENTION

The field of the present invention relates to buildings or land vehicles for housing people or transporting people, or any other element such as street furniture, noise barriers, greenhouses, balustrades, louvers or double skin glasses, which comprise laminated assembly with conductive means.

BACKGROUND OF THE INVENTION

Nowadays, more and more laminated assemblies are functional assemblies such as lighting, privacy (like electrochromic, . . . ), video, sound, heating functions and much more other functions. Theses laminated assemblies are equipped with functional elements able to functionalized the laminated assembly.

These functional elements are inserted inside the laminated assembly. In this way, to work, to communicate, to be powered, . . . these functional elements needs to be linked to the outside of the laminated assembly. The link could be a flat cable, a flat connector, a wire, or any other link able to link functional elements to the outside of the laminated assembly and compatible with a lamination process.

The following description relates to an automotive laminated assembly but it is understood that the invention may be applicable to others fields like architectural glazing which may provide electrically functional component or an electrically functional layer coupled with a laminated assembly.

Currently, more and more vehicles are equipped with laminated assembly, especially windshield, ensuring the defrosting function. This function is performed by an electric current passing through resistive means.

The resistive means can be either a thin metal wires network (wires made, for example, of W or Cu) or a conductive layer such as a stack of several thin layers containing layers of metallic Silver or a TCO (Transparent Conductive Oxyde) type "SnO2" layer. In both cases, several collectors of conductive metal (e.g. copper) are inserted in the laminated assembly to ensure contact with the wires network or the conductive layer.

For example, a heated wires windshield contains wires fixed on the thermoplastic interlayer. These wires are connected to busbars that are themselves connected to connectors connected to the outside of the windshield.

These collectors are themselves connected to the external current source by inserted connectors in the glazing. These connectors are made of a conductive metal strip (for example copper or tinned copper) coated with a polymer insulating coating. There are usually flats. For the following description, the term flat connector is used but it is understood that is any other link or connector can be taken into account.

The sealing at the flat connector is ensured by applying a sealing tape. The sealing tape is generally based acrylic adhesive. Glazing with this sealing tape have moisture penetration problems. Moisture penetration modes can be multiple:

a poor bonding with the presence of air bubbles fostering the creation of water penetration routes,
sealing surface is too small to have a good adhesion,
by capillary rise along the flat connector,
degradation of the sealing tape itself.

Currently, a way to avoid this problem is to remove the sealing tape. The tightness of the assembly can be obtained by making two notches through the thermoplastic interlayer and bending and passing the flat connector by these notches.

Disadvantages of this approach are multiple:

the tightness is not ensure between the edge of the assembly and first notch of the thermoplastic interlayer;
the bonding area of the flat connector between the two notches is structurally and geometrically limited, around 3 mm.
in the case where the collector is attached to an inner face of the glazing prior the positioning of the thermoplastic interlayer, bending and passing the flat connector by notches of the thermoplastic interlayer is problematic.

The invention provides a solution to overcome these problems.

SUMMARY OF THE INVENTION

The invention relates to an improved laminated assembly comprising functional elements with connections extending outside of the laminated assembly preventing air, moisture and water from entering the assembly. The invention relates also to a method to prevent air, moisture and water from entering a laminated assembly. The invention relates also to the use a thin thermoplastic patch to prevent air, moisture and water from entering a laminated assembly.

Thus, the invention relates to a laminated assembly comprising:

a first and a second substrates laminated together by at least one thermoplastic interlayer;
at least a functional element disposed between the two substrates;
a conductive mean disposed between the first substrate and the at least one thermoplastic interlayer; the said conductive mean is connected to the functional element and extending outside of the laminated assembly.

It is understood that the said conductive mean could be disposed on the inner surface of the first substrate, disposed on the surface facing to the first substrate of the thermoplastic interlayer. It is also understood that the at least a part of the conductive mean could be disposed between the first substrate and the at least one thermoplastic interlayer, in the case of the conductive mean needs to pass through the thermoplastic interlayer to be in contact with the functional element.

According to the present invention, a thin thermoplastic patch is arranged between the conductive mean and the first substrate to prevent air, moisture and water from entering the assembly. It is understood that thermoplastic means thermoplastic material such as polyvinyl butyral, ethylene-vinyl acetate or cyclic olefin copolymer. According to one possible embodiment, the thin thermoplastic film is chosen from the group consisting of PVBs, plasticized PVCs, polyurethane (PU) and ethylene-vinyl acetates (EVAs), . . . .

The air, water and moisture tightness extends also to solvents, water-based liquids like automotive cleaning products or gas.

Preferably, in case of plurality of conductive means extending outside of the laminated assembly, it is understood that thin thermoplastic patches are needed to ensure the tightness of the laminated assembly around exit of conductive means of the laminated assembly.

According to one possible embodiment, the thermoplastic interlayer is chosen from the group consisting of PVBs, plasticized PVCs, polyurethane (PU) and ethylene-vinyl acetates (EVAs), or any other material able to laminate an assembly such as described in the present invention.

According to one possible embodiment, the thermoplastic interlayer is a multilayer thermoplastic interlayer. Each layer can have different compositions, color, . . . .

Preferably, the thermoplastic interlayer and the thin thermoplastic patch have the same nature of material. In the case of a multilayer thermoplastic interlayer, the thin thermoplastic film is, preferably, same nature of material than the material of the layer with which is in contact.

According to the invention, the thin thermoplastic patch is larger than the conductive means. It is means that the conductive means extend over edges of the flat connector to be able to be fix to the thermoplastic interlayer. Preferably, the thin thermoplastic patch is larger than the connector of at least 2 mm, preferably at least 5 mm.

According to the invention, the thickness of the thin thermoplastic film after lamination is more than 45 μm and less than 300 μm, preferably more than 100 μm and less than 250 μm.

According to the present invention, substrates can be a flat or curved panel to fit with the design of the assembly.

According to the invention, at least one of the two substrates is a transparent substrate. Also, the transparent substrate can be clear or mass-colored or tinted with a specific composition or by applying a coating or a plastic layer for example. Preferably, the transparent substrate is a glass substrate.

According to the invention, the laminated assembly is an automotive laminated assembly. Preferably, the laminated assembly is a sunroof, a sidelite, a backlite or a windshield. And more preferably, the laminated assembly is a windshield.

According to the invention, the functional element comprises wires and/or busbar able to heat the laminated assembly.

According to one possible embodiment, the functional element comprises a coated element able to heat the laminated assembly. Such coated element often have metal compounds, sandwiched between metal oxides, for making coated element electrically conductive. This coated element has been utilized in defogging or defrosting systems and even as active antenna elements for vehicles. The coating element has been applied to assembly to absorb heat from sunlight penetrating the assembly. In particular, coated element absorbs infrared radiation from sunlight. In so doing, coated element reduces the amount of infrared radiation entering an interior of the vehicle. Coated element enables a lower interior temperature as compared to a vehicle having a windshield, for example, with no coating element. As a result, during the warm months, less energy is required to lower the interior temperature of the vehicle. To maximize efficiency of coated element to absorb infrared radiation, coated element is often applied over a substantial part of the assembly, often covering the entire field of view of the driver, in case of a windshield.

According to one possible embodiment, the functional element is an antenna. Preferably, the said antenna is printed or glued on the laminated assembly.

Antennas are essential components of all equipment that uses radio. They are used in systems such as radio broadcasting, broadcast television, two-way radio, communications receivers, radar, cell phones, and satellite communications, as well as other devices such as garage door openers, wireless microphones, Bluetooth-enabled devices, wireless computer networks, baby monitors, and RFID tags on merchandise.

Typically, an antenna consists of an arrangement of metallic conductors, electrically connected (often through a transmission line) to the receiver or transmitter. An oscillating current of electrons forced through the antenna by a transmitter will create an oscillating magnetic field around the antenna elements, while the charge of the electrons also creates an oscillating electric field along the elements.

In the automotive field, antennas are used to send and/or to receive information such as radio, TV or cell phone signals (GSM) but also to communicate with the vehicle, i.e. to be able to open car doors without having to insert the key, with other vehicles, i.e. to keep a distance between to vehicle, or with the environment, i.e. tolls, traffic lights, . . . .

Modern cars may contain multiple antennas for analog audio broadcasts (amplitude modulated (AM—0.5-1.7 MHz) and frequency modulated (FM—76-108 MHz), global positioning system (GPS—1575 MHz) data, cellular phone communication, e.g. global system for communication (GSM—800/1800 MHz), long term evolution (LTE—800/1800/2600 MHz), digital audio broadcasting (DAB—170-240 MHz), remote keyless entry (RKE—315/433 MHz), television reception, tire pressure monitor system (TPMS—315/433 MHz), automotive radar (22-26 GHz/76-77 GHz), car to car communication (C2C—5.9 GHz), etc.

FIGURES

The present invention will now be more particularly described with reference to drawings and exemplary embodiments, which are provided by way of illustration and not of limitation. The drawings are a schematic representation and not true to scale. The drawings do not restrict the invention in any way. More advantages will be explained with examples.

Figure 1:
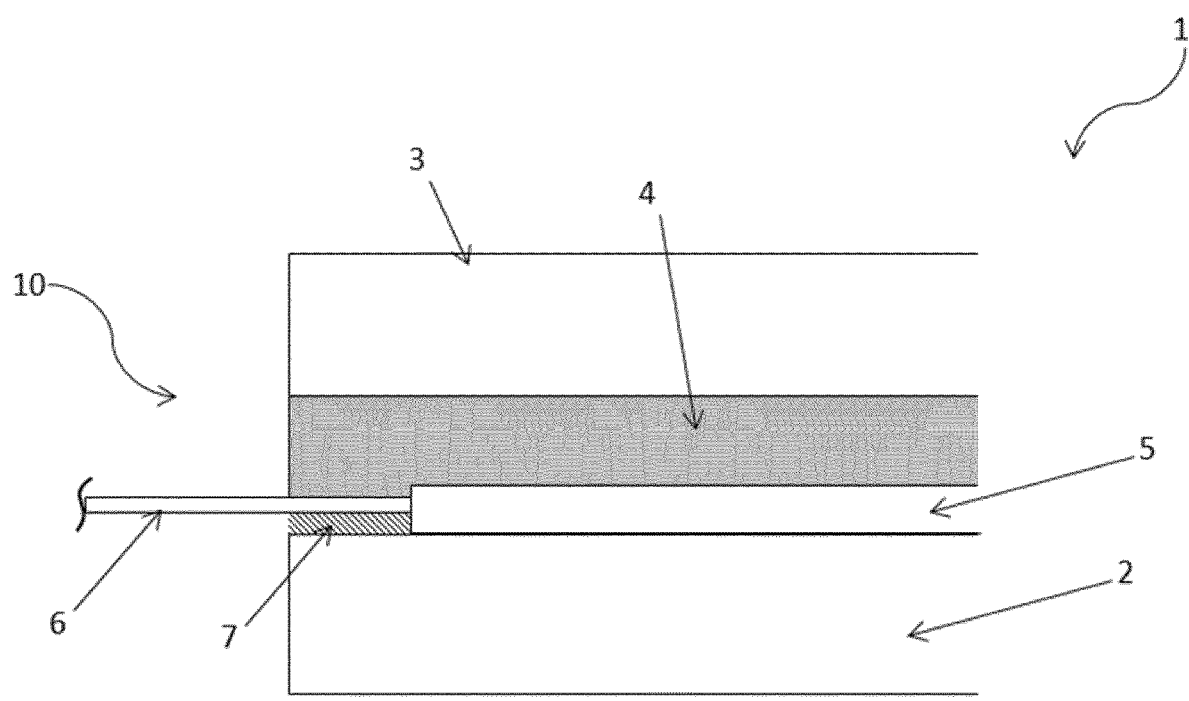
FIG. 1 is a side view according of one embodiment of this invention.

Referring to the FIG. 1 according to an embodiment of this invention, a laminated assembly 1 comprises:
- a first 2 and a second 3 substrates laminated together by at least one thermoplastic interlayer 4;
- at least a functional element 5 disposed between the two substrates;
- a conductive mean 6 disposed between the first substrate 2 and the at least one thermoplastic interlayer 4; the said conductive mean 6 is connected to the functional element 5 and extending outside of the laminated assembly 1.

According to the present invention, a thin thermoplastic patch 7 is arranged between the conductive mean 6 and the first substrate 2 to prevent air, moisture and water from entering the laminated assembly 1.

In this embodiment, the conductive mean 6 and the functional element 5 are both between the first substrate 2 and the thermoplastic interlayer 4. Preferably, the thin thermoplastic patch 7 is dimensioned to be placed between the functional element 5 and the outside 10 of the laminated assembly 1. More preferably, the thin thermoplastic patch 7 is longer than the distance between the functional element 5 and the outside 10 of the laminated assembly 1 to be able to ensure to prevent air, moisture and water from entering the laminated assembly 1 and also to be able to maintain the conductive mean 6 to the first substrate 2 during handling of the laminated assembly 1.

Figure 2:
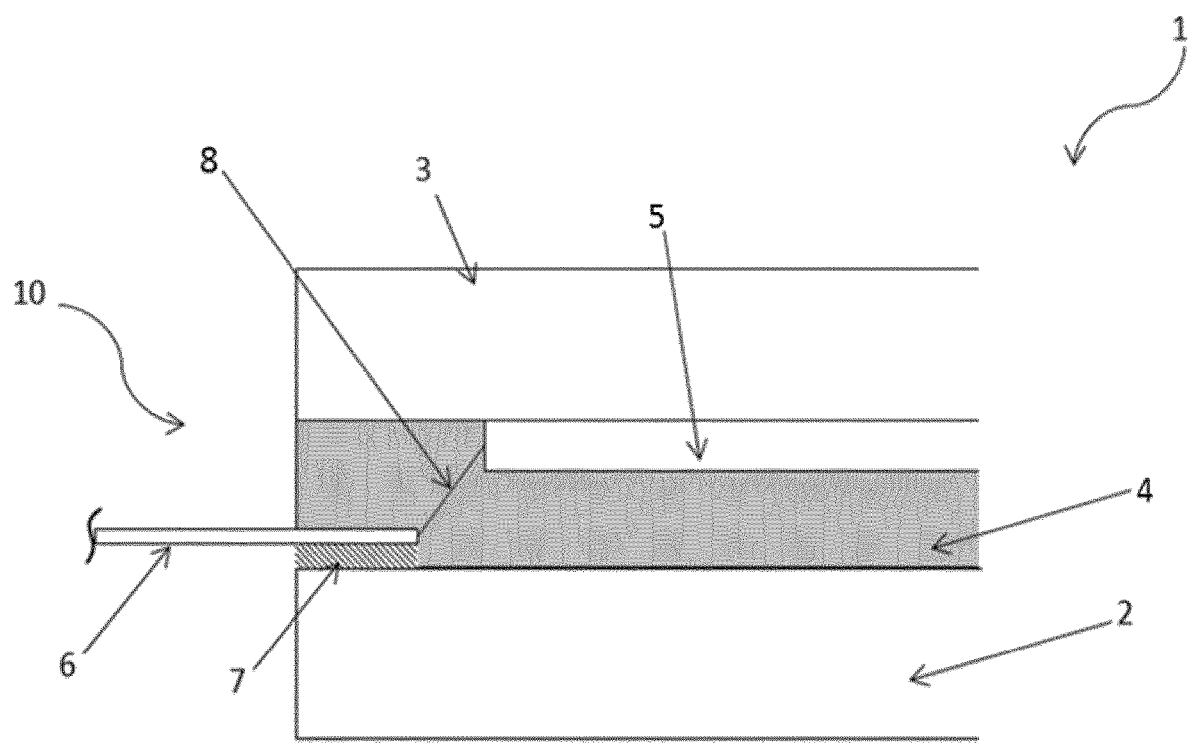
FIG. 2 is a side view according of another embodiment of this invention.

Referring to the FIG. 2 according to another embodiment of this invention, in contrast to the embodiment of FIG. 1, the conductive mean 6 and the functional element 5 are not together between the first substrate 2 and the thermoplastic interlayer 4; only the conductive mean is between the first substrate 2 and the thermoplastic interlayer 4. The functional element 5 could be between the second substrate 3 and the thermoplastic interlayer 4 or integrated in the thermoplastic interlayer 4. In this case, to connect the conductive mean 6 to the functional element 5, a supplementary mean 8 is added passing through at least a part of the thermoplastic interlayer 4. The supplementary mean 8 could be separate mean connected to the conductive mean 6 and to the functional element 5 or a part of the conductive mean 6 to minimize material, soldering, . . . .

Figure 3:
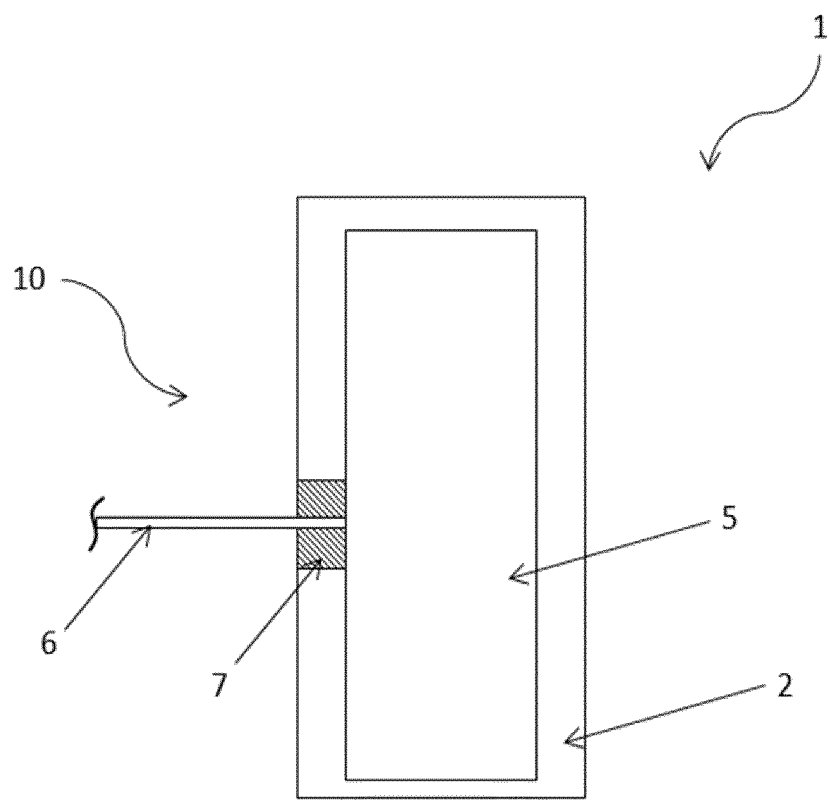
FIG. 3 is a plan view according of one embodiment of this invention.

Referring to the FIG. 3 according to an embodiment of this invention, the thin thermoplastic patch 7 is larger than the conductive mean 6. It means that the thin thermoplastic patch 7 extends over the border of the conductive mean 6 to be able to fix the thin thermoplastic patch 7 to the thermoplastic interlayer 4 and to ensure the tightness at the border of the conductive mean 6.

A method to prevent air, moisture and water from entering a laminated assembly 1 comprising:
- a first 2 and a second 3 substrates laminated together by at least one thermoplastic interlayer 4;
- at least a functional element 5 disposed between the two substrates 2, 3;
- a conductive mean 6 disposed between the first substrate 2 and the at least one thermoplastic interlayer 4; the said conductive mean 6 is connected to the functional element 5 and extending outside of the laminated assembly;
- comprises a thin thermoplastic patch 7 is arranged between the conductive mean 6 and the first substrate 2 to prevent air, moisture and water from entering the assembly.

According to the invention, as an not limitative example, a laminated assembly 1 is processed by applying a PVB interlay 4 comprising heatable wires 5, as functional elements, on the second substrate 3. On the PVB interlayer 4, a Cu-based busbar is fixed and soldered with the heatable wires. A conductive mean 6, a flat connector, is soldered on the Cu-based busbar and extends outside of the assembly 1. On this flat connector 6, a thin PVB patch 7 of a thickness of around 200 μm is fixed above the flat connector 6 by soldering portions of the PVB patch 7 to the PVB interlayer 4. The first glass substrate 2 is placed above this made structure. The whole assembly is then autoclaved to obtain a laminated assembly 1 preventing air, moisture and water from entering the assembly.

According to the invention, as an not limitative example, a conductive mean 6 is directly soldered on a coating 5 deposited on one of the substrates 2, 3 or on the interlayer 4. In this case, the thermoplastic patch 7 is arranged between the first substrate 2 and the conductive mean 6. The coating 5 could exceed on the whole surface or a part of the surface of the first substrate 2 where the thermoplastic patch 7 is arranged on.

The invention claimed is:

1. A laminated assembly comprising:
   a first substrate and a second substrate laminated together by at least one thermoplastic interlayer;
   at least a functional element disposed between the first and second substrates;
   a conductive means disposed between the first substrate and the at least one thermoplastic interlayer, said conductive means connected to the functional element and extending outside of the laminated assembly, and said conductive means having a first surface facing the first substrate and a second surface opposite the first surface and facing the second substrate;
   wherein a thin thermoplastic patch is arranged in contact with the conductive means and the first substrate to prevent air, moisture and water from entering the assembly, and wherein the patch is also arranged between the first and second substrates.

2. The laminated assembly according to claim 1, wherein at least one of the first and second substrates is a transparent substrate.

3. The laminated assembly according to claim 2, wherein the transparent substrate is a glass substrate.

4. The laminated assembly according to claim 1, wherein the laminated assembly is an automotive laminated assembly.

5. The laminated assembly according to claim 1, wherein the laminated assembly is a windshield.

6. The laminated assembly according to claim 1, wherein the functional element comprises wires able to heat the laminated assembly.

7. The laminated assembly according to claim 1, wherein the functional element comprises a coated element able to heat the laminated assembly.

8. The laminated assembly according to claim 1, wherein the thin thermoplastic patch is larger than the conductive means.

9. The laminated assembly according to claim 8, wherein the thin thermoplastic patch is larger than a connector of at least 2 mm.

10. The laminated assembly according to claim 1, wherein the thermoplastic interlayer and the thin thermoplastic patch have a same nature of material.

11. The laminated assembly according to claim 1, wherein a thickness of the thin thermoplastic patch is more than 45 μm and less than 300 μm.

12. A method to prevent air, moisture and water from entering a laminated assembly comprising:
   laminating a first substrate and a second substrate together by at least one thermoplastic interlayer;
   providing at least a functional element disposed between the two substrates; and
   disposing a conductive means between the first substrate and the at least one thermoplastic interlayer, the conductive means connected to the functional element and extending outside of the laminated assembly, and the conductive means having a first surface facing the first substrate and a second surface opposite the first surface and facing the second substrate,
   wherein a thin thermoplastic patch is arranged in contact with the conductive means and the first substrate to prevent air, moisture and water from entering the assembly and wherein the patch is also arranged between the first and second substrates.

13. The laminated assembly according to claim 8, wherein the thin thermoplastic patch is lamer than a connector of at least 5 mm.

14. The laminated assembly according to claim 1, wherein a thickness of the thin thermoplastic film is more than 100 μm and less than 250 μm.

15. A laminated assembly comprising:
   a first substrate and a second substrate laminated together by at least one thermoplastic interlayer;
   at least a functional element disposed between the first and second substrates;

a conductive connector disposed between the first substrate and the at least one thermoplastic interlayer, said conductive connector connected to the functional element and extending outside of the laminated assembly, and the conductive connector having a first surface facing the first substrate and a second surface facing the second substrate;

wherein a thermoplastic patch is arranged between the conductive connector and the first substrate to prevent air, moisture and water from entering the assembly, and wherein the thermoplastic patch contacts only one of the first surface and the second surface of the conductive connector.

16. The laminated assembly according to claim 15, wherein a thickness of the thermoplastic patch is more than 45 μm and less than 300 μm.

17. The laminated assembly according to claim 15, wherein the thermoplastic patch is located between the functional element and an outside of the laminated assembly.

18. The laminated assembly according to claim 15, wherein the first and second substrates are transparent glass substrates and the thermoplastic interlayer comprises PVB.

19. The laminated assembly according to claim 15, wherein the patch contacts only one conductor.

20. The laminated assembly according to claim 15, wherein the patch and the thermoplastic interlayer contact adjacent portions of a surface of one of the substrates.

21. The laminated assembly according to claim 1, wherein the thin thermoplastic patch contacts only one of the first surface and the second surface of the conductive means.

* * * * *